(12) United States Patent
Yamazaki et al.

(10) Patent No.: US 8,576,344 B2
(45) Date of Patent: Nov. 5, 2013

(54) PROJECTION CONTROL DEVICE, PROJECTION CONTROL METHOD, AND PROGRAM

(75) Inventors: Tatsuya Yamazaki, Tokyo (JP); Katsumi Ikuta, Tokyo (JP); Atsuko Kashiwagi, Kanagawa (JP); Nobutaka Saitoh, Kanagawa (JP); Nobuhito Ebine, Tokyo (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 13/247,561

(22) Filed: Sep. 28, 2011

(65) Prior Publication Data

US 2012/0105738 A1    May 3, 2012

(30) Foreign Application Priority Data

Oct. 29, 2010    (JP) ................. P2010-244425

(51) Int. Cl.
*H04N 5/64*    (2006.01)
*H04N 5/225*    (2006.01)
*G03B 21/00*    (2006.01)
*H04M 1/00*    (2006.01)
*H04B 1/38*    (2006.01)

(52) U.S. Cl.
USPC ........... 348/744; 348/373; 353/122; 455/566; 455/557

(58) Field of Classification Search
None
See application file for complete search history.

(56) References Cited

U.S. PATENT DOCUMENTS

| | | | | |
|---|---|---|---|---|
| 2002/0063855 A1* | 5/2002 | Williams | | 353/122 |
| 2002/0196360 A1* | 12/2002 | Miyadera | | 348/373 |
| 2006/0121940 A1* | 6/2006 | Kong et al. | | 455/557 |
| 2010/0002151 A1* | 1/2010 | Pan | | 348/744 |
| 2010/0210312 A1* | 8/2010 | Kim et al. | | 455/566 |

FOREIGN PATENT DOCUMENTS

JP    2009-186712    8/2009

OTHER PUBLICATIONS

U.S. Appl. No. 13/235,826, filed Sep. 19, 2011, Yamazaki, et al.
U.S. Appl. No. 13/269,751, filed Oct. 10, 2011, Yamazaki, et al.

\* cited by examiner

*Primary Examiner* — Jefferey Harold
*Assistant Examiner* — Sean Haiem
(74) *Attorney, Agent, or Firm* — Oblon, Spivak, McClelland, Maier & Neustadt, L.L.P.

(57) ABSTRACT

An information processing apparatus that includes a main body, a member movably attached to the main body, a first detector configured to detect an orientation of the member with respect to the main body, a second detector configured to detect whether the main body is connected to a cradle apparatus, and a processor configured to output a command for controlling an operation of a projection device based on an output of the first and second detectors.

16 Claims, 13 Drawing Sheets

FIG. 13

|     | PANEL OPEN | FLIPPED-PANEL STORAGE | PANEL CLOSED |
| --- | --- | --- | --- |
| ID1 | △ | ○ | × |
| ID2 | ○ | △ | × |

○...PROJECTION ON
△...DISPLAY PROJECTION METHOD
×...PROJECTION OFF

PROJECTION CONTROL DEVICE, PROJECTION CONTROL METHOD, AND PROGRAM

CROSS REFERENCE TO RELATED APPLICATIONS

This application claims the benefit of priority under 35 U.S.C. §119 to Japanese Patent Application JP 2010-244425 filed in the Japan Patent Office on Oct. 29, 2010, the entire content of which is hereby incorporated by reference.

BACKGROUND

The present disclosure relates to a projection control device, a projection control method, and a program.

Recently, imaging devices mounted with small projectors have been proposed. According to such imaging device, content acquired through imaging can be projected from the projector. Thus, the content can be viewed by a large number of users without using a display device.

As devices mounted with small projectors, charging cradles have also been proposed (for example, see JP 2009-186712A).

SUMMARY

Since the aforementioned imaging device has a projector module, there is a problem in that the size of the main body is increased, which could cause inconvenience in carrying about the imaging device.

In response to such problem, if an imaging device is placed on a cradle that is mounted with a small projector, and content is projected from the small projector, it would become possible to perform projection on a large screen without increasing the size of the main body.

However, as a button on the cradle or a menu of the main body of the imaging device should be operated in the period after the imaging device is placed on the cradle till projection by the projector is started, there is a problem in that the operation for starting the projection is complex.

In light of the foregoing, it is desirable to provide an imaging device, a method for controlling the imaging device, and a program, which are novel and improved, and which can reduce the burden of the complex operation for starting projection from a projection unit.

According to an exemplary embodiment, the present disclosure is directed to an information processing apparatus that includes a main body, a member movably attached to the main body, a first detector that detects an orientation of the member with respect to the main body, a second detector that detects whether the main body is connected to a cradle apparatus, and a processor that outputs a command for controlling an operation of a projection device based on an output of the first and second detectors.

According to another exemplary embodiment, the present disclosure is directed to an information processing method performed by an information processing apparatus. The information processing method including detecting, by a first detector of the information processing apparatus, an orientation of a member movably attached to a main body of the information processing apparatus with respect to the main body, detecting, by a second detector of the information processing apparatus, whether the main body is connected to a cradle apparatus, and controlling, by a processor of the information processing apparatus, an operation of a projection device based on an output of the first and second detectors.

According to another exemplary embodiment, the present disclosure is directed to an information processing apparatus including a projection device, an interface that receives a command for controlling an operation of the projection device from a second information processing device, wherein the received command is generated based on a detection of an orientation of a member moveably attached to a main body with respect to the main body of the second information processing apparatus, and a processor that controls the projection device based on the received command.

According to the embodiments of the present disclosure described above, it is possible to reduce the burden of the complex operation for starting projection from a projection unit.

BRIEF DESCRIPTION OF THE DRAWINGS

FIG. 13 is a diagram illustrating the relationship between ID of a cradle and projection control of an imaging device in accordance with the third embodiment of the present disclosure.

DETAILED DESCRIPTION OF THE EMBODIMENTS

Figure 1:
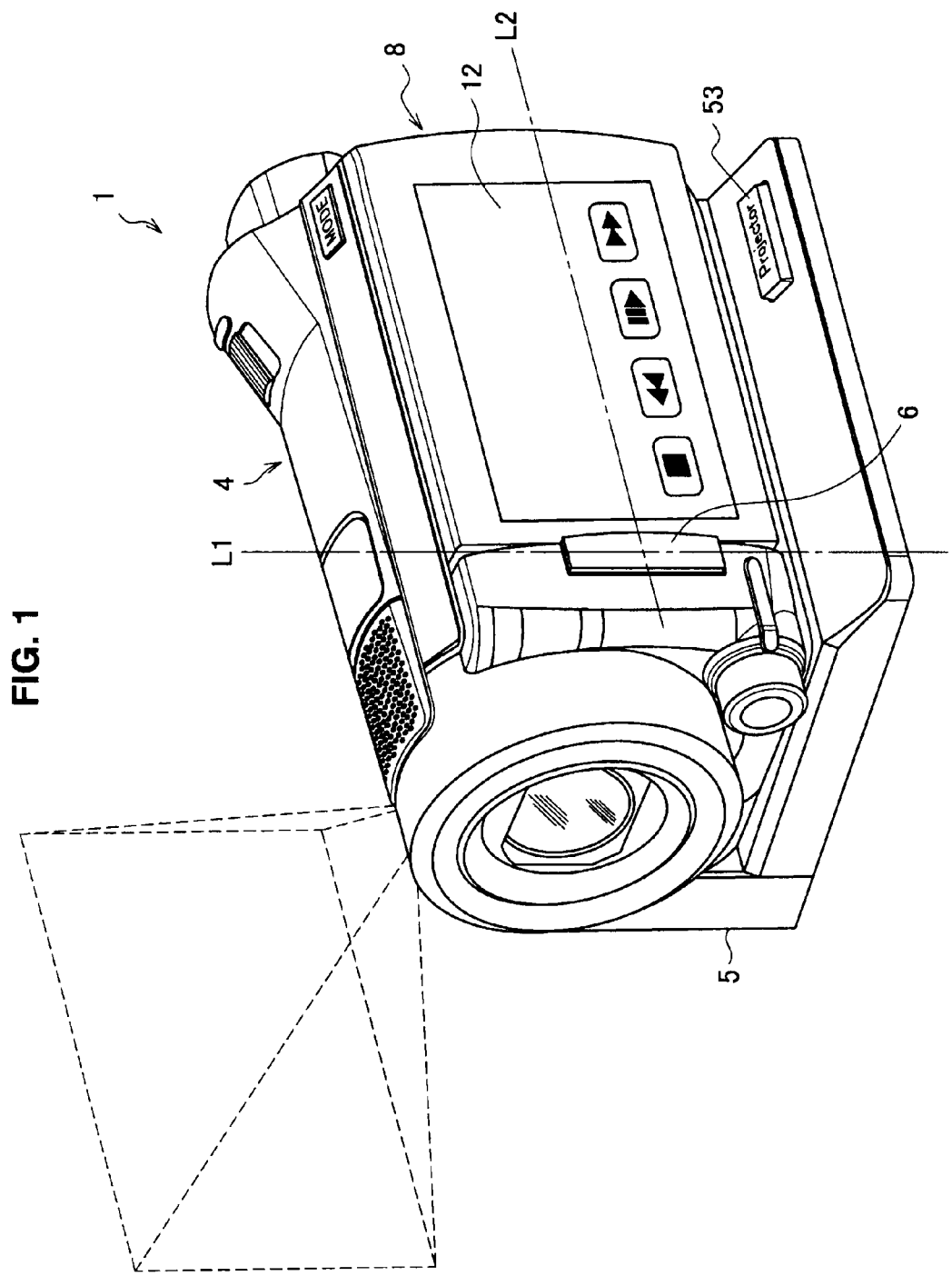
FIG. 1 is a perspective view showing the appearance of an imaging device and a cradle in accordance with the first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The "DETAILED DESCRIPTION OF THE EMBODIMENTS" will be described in accordance with the following order.

1. First Embodiment
   1-1. Summary of Projection System Having Imaging Device and Cradle
   1-2. Basic Configuration of Imaging Device
   1-3. Configuration and Operation of Imaging Device and Cradle in accordance with First Embodiment
2. Second Embodiment
3. Third Embodiment
4. Fourth Embodiment
5. Conclusion

1. FIRST EMBODIMENT

The present disclosure can be implemented in various configurations as exemplarily described in detail in "1. First Embodiment" to "3. Third Embodiment." In addition, a projection control device (an imaging device 1) described in each embodiment includes:

A: a main body unit 4;
B: a placement detection unit (a cradle detection unit 108) that detects that the main body unit 4 has been placed on a projection device (a cradle 5);
C: a movable member (an open/close unit 8) provided with an operation unit (a touch panel 12) and connected to the main body unit such that the direction that the operation unit faces with respect to the main body unit is adjustable; and
D: a projection control unit (a control unit 10) that controls, when the placement detection unit detects that the main body unit has been placed on the projection device, the start of projection from the projection device in accordance with the direction that the operation unit faces with respect to the main body unit.

In this specification, an imaging device is referred to as an example of a projection control device. In addition, although an imaging device 1 (a video camera) is shown as an example of an imaging device in each embodiment of the present disclosure, the imaging device is not limited thereto. For example, the imaging device can be an information processing device such as a PC (Personal Computer), a PDA (Personal Digital Assistant), a home game machine, a portable phone, a PHS (Personal Handyphone System), a portable music playback device, a portable image processing device, or a portable game machine.

[1-1. Summary of Projection System Having Imaging Device and Cradle]

First, a summary of a projection system in accordance with an embodiment of the present disclosure will be described with reference to FIGS. 1 and 2.

Figure 2:
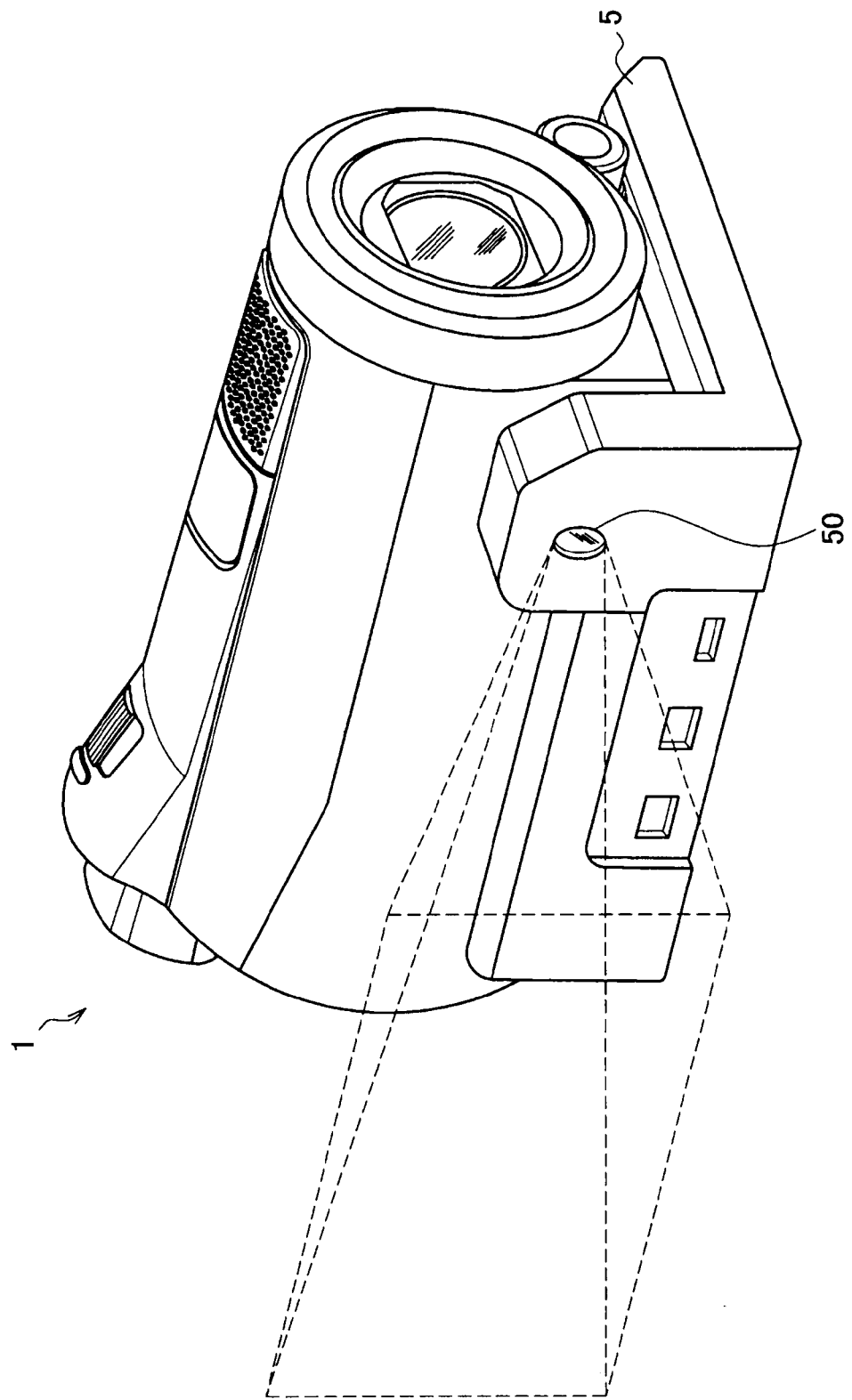
FIG. 2 is a perspective view showing the appearance of the imaging device and the cradle in accordance with the first embodiment of the present disclosure.

FIGS. 1 and 2 are perspective views each showing the appearance of the imaging device 1 and the cradle 5 in accordance with an embodiment of the present disclosure. As shown in FIGS. 1 and 2, when the imaging device 1 is placed on the cradle 5 and the open/close unit 8 is put in a state of being closed with respect to the main body unit with the touch panel 12 facing outward, a projection module 50 of the cradle 5 starts projection of a screen generated by the imaging device 1. Note that while a screen is projected from the projector module 50, the touch panel 12 can display the same screen as the projection screen, display a screen that is different from the projection screen, or display no screen.

Next, the cradle 5 of the projection system in accordance with this embodiment will be described. The cradle 5 includes the projector module 50 and a projector operation unit 53. The projector operation unit 53 receives a user's operation for forcibly switching whether or not to project a screen, which has been generated by the imaging device 1, from the projector module 50 shown in FIG. 2. The projector operation unit 53 is a pressing button as shown in FIG. 1, for example. In this case, the imaging device 1 switches whether or not to project a screen from the projector module 50 in accordance with pressure applied to the button.

Next, the imaging device 1 of the projection system in accordance with this embodiment will be described with reference to FIGS. 1 and 3. The imaging device 1 includes the main body unit 4 having an imaging unit 30 and a control unit 10, which are described below with reference to FIG. 7, and the open/close unit 8 provided with the touch panel 12.

The open/close unit 8 is connected to the main body unit 4 via a hinge mechanism 6. Specifically, the open/close unit 8 is connected to the main body unit 4 via the hinge mechanism 6 such that it can rotate about a first rotation axis (an open/close axis) L1 and about a second rotation axis L2, which is perpendicular to the first rotation axis L1, shown in FIG. 1. FIG. 1 shows a state in which the open/close unit 8 is closed with respect to the main body unit 4 with the touch panel 12 facing outward, while FIG. 3 shows a state in which the open/close unit 8 is rotated about the first rotation axis L1 so that the open/close unit 8 is open with respect to the main body unit 4, and further the open/close unit 8 is rotated about the second rotation axis L2 so that the touch panel 12 faces inward.

Described above is a summary of the projection system in accordance with this embodiment. Next, the basic configuration of the imaging device 1 will be described.

[1-2. Basic Configuration of Imaging Device]

Hereinafter, a basic configuration of the imaging device 1 that is common to each embodiment of the present disclosure will be described with reference to FIGS. 3 to 6.

Figure 3:
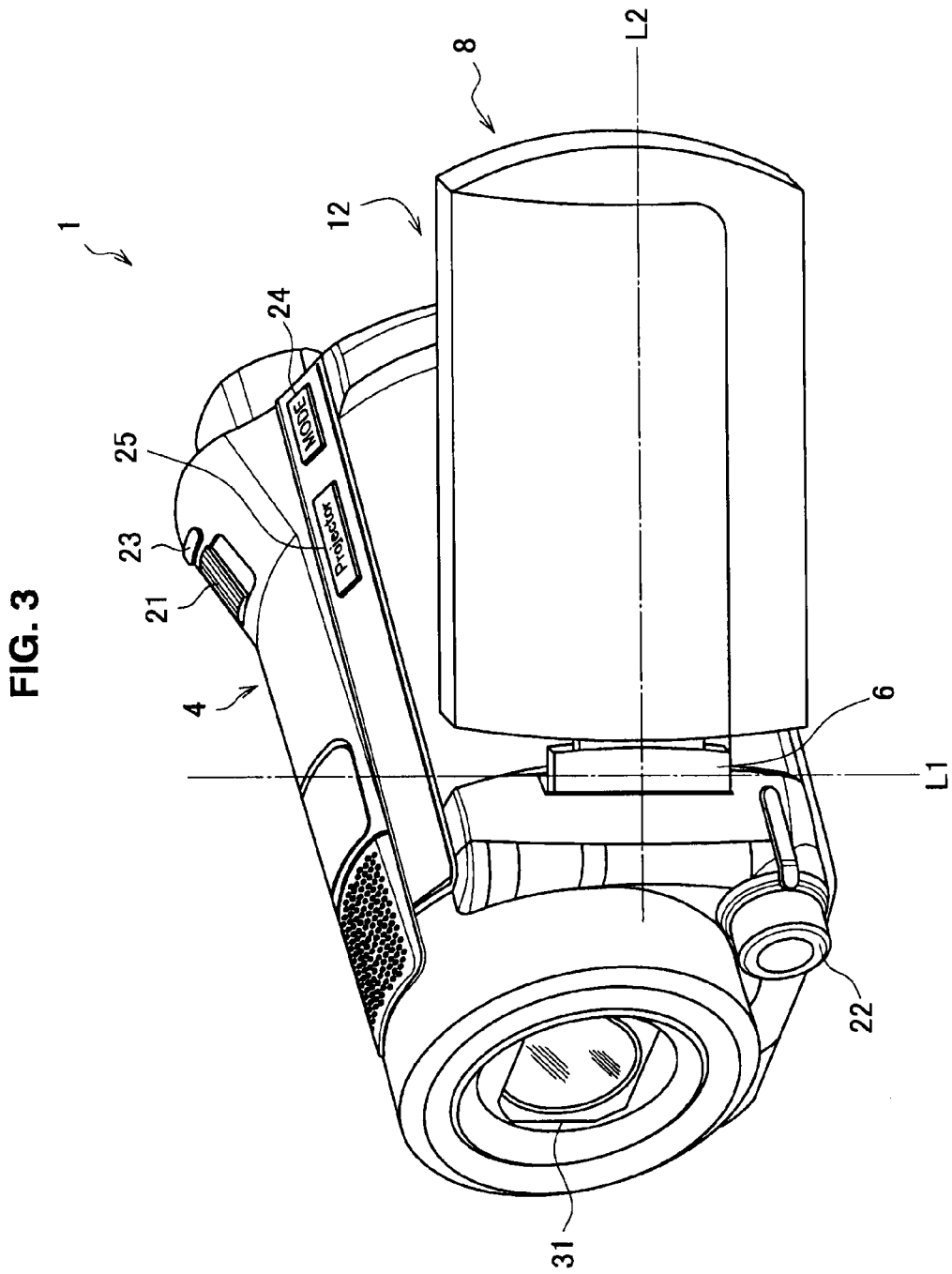
FIG. 3 is a perspective view showing the appearance of the imaging device in accordance with the first embodiment of the present disclosure.

FIG. 3 is a perspective view showing the appearance of the imaging device 1 in accordance with an embodiment of the present disclosure. As shown in FIG. 3, the imaging device 1 includes the main body unit 4, the hinge mechanism 6, and the open/close unit 8. Although FIG. 3 shows the imaging device 1 (video camera) as an example of the imaging device, the imaging device is not limited thereto. For example, the imaging device can be an information processing device such as a PC (Personal Computer), a PDA (Personal Digital Assistant), a home game machine, a portable phone, a PHS (Personal Handyphone System), a portable music playback device, a portable image processing device, or a portable game machine.

The main body unit 4 of the imaging device 1 includes a zoom operation unit 21, a manual operation unit 22, a still image capturing operation unit 23, a mode operation unit 24, a projection switching operation unit 25, and an imaging optical unit 31.

The imaging optical unit 31 is an imaging unit that includes a shooting lens for condensing light emitted from a subject and a zoom lens, and that forms an image of the subject at a signal conversion unit such as a CCD (Charge Coupled Device) or a CMOS (Complementary Metal Oxide Semiconductor). When an image of the subject is formed at the signal conversion unit, the image of the subject is converted into an electrical image signal by the signal conversion unit.

The zoom operation unit 21 receives a user's operation for changing the focal length of the imaging optical unit 31. The zoom operation unit 21 includes a lever that can be tiled to a wide position or a telephoto position as shown in FIG. 3, for example. In this case, the imaging optical unit 31 reduces the focal length (shrinks the image of the subject) when the lever is tilted to the wide position, and increases the focal length (enlarges the image of the subject) when the lever is tilted to the telephoto position.

The manual operation unit 22 receives a user's operation for focusing the imaging optical unit 31. The manual operation unit 22 includes a dial that can rotate clockwise or counterclockwise as shown in FIG. 3, for example. In this case, the imaging optical unit 31 adjusts the focal position in accordance with the rotation direction and the rotation amount of the dial.

The still image capturing operation unit 23 receives a user's operation for capturing a still image. The still image capturing operation unit 23 includes a pressing button as shown in FIG. 3, for example. In this case, the imaging device 1 captures a still image in accordance with pressure applied to the button, thereby acquiring image data of the still image.

The mode operation unit 24 receives a user's operation for switching the operation mode of the imaging device 1. Herein, operation modes of the imaging device 1 are broadly divided into a shooting mode and a playback mode, for example. The mode operation unit 24 includes a pressing button as shown in FIG. 3, for example. In this case, the imaging device 1 switches the operation mode between the shooting mode and the playback mode in accordance with pressure applied to the button.

Note that the shooting mode is an operation mode for capturing an image of a subject by operating the imaging optical unit 31, the signal conversion unit, and the like. Meanwhile, the playback mode is an operation mode for playing back the image data acquired in the shooting mode, for example. The details of such operation modes are described below with reference to FIG. 4 to FIG. 6.

Described above is the configuration of the main body unit 4 of the imaging device 1. Next, the open/close unit 8 will be described. As described above, the open/close unit 8 is connected to the main body unit 4 via the hinge mechanism 6. Further, the open/close unit 8 is connected to the main body unit 4 via the hinge mechanism 6 such that it can rotate about the first rotation axis (open/close axis) L1 and about the second rotation axis L2, which is perpendicular to the first rotation axis L1, shown in FIG. 3.

Such open/close unit 8 has the touch panel 12 on one side as shown in FIG. 1. FIG. 3 shows a state in which the open/close unit 8 is rotated about the first rotation axis L1 so that the open/close unit 8 is open with respect to the main body unit 4 with the touch panel 12 facing inward.

The touch panel 12 is an example of an operation display unit having a display function and an operation detection function. The touch panel 12 can display an image of a subject obtained by focusing light with the imaging optical unit 31 in the shooting mode, and can display an index screen, a playback screen, or the like described below in the playback mode. In addition, the user is able to input various instructions or information to the imaging device 1 by operating the touch panel 12.

(Shooting Mode and Playback Mode)

Described above is the basic configuration of the imaging device 1 in accordance with an embodiment of the present disclosure. Next, the shooting mode and the playback mode, which are the operation modes of the imaging device 1, will be described.

Figure 4:
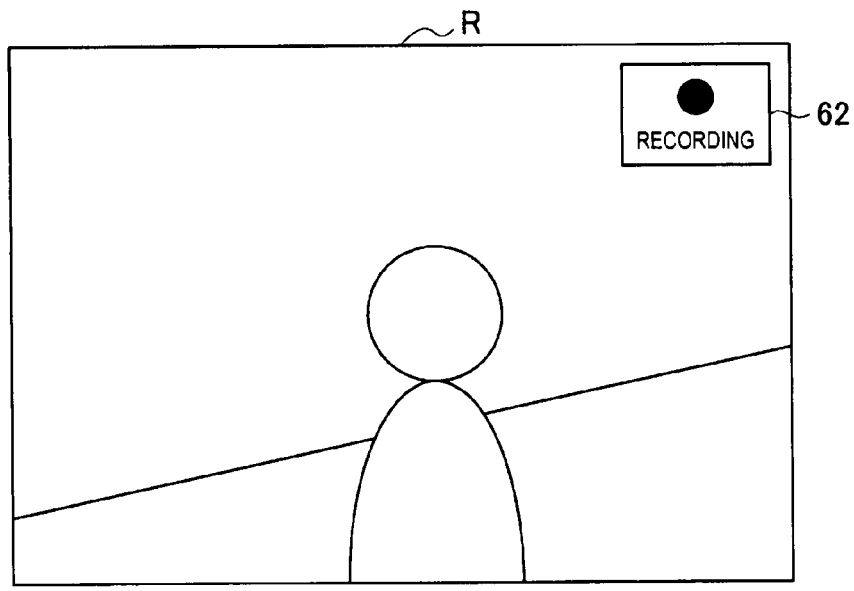
FIG. 4 is an explanatory diagram showing a specific example of an imaging screen.

The shooting mode is an operation mode for capturing an image of a subject by operating the imaging optical unit 31, the signal conversion unit, and the like. In this shooting mode, an imaging screen R of a subject obtained by the imaging optical unit 31 is displayed on the touch panel 12 as shown in FIG. 4. Further, while the imaging screen R is being recorded, a recording mark 62 is added to the imaging screen R as shown in FIG. 4.

Note that when the still image capturing operation unit 23 is pressed by the user in the shooting mode, the imaging device 1 captures a still image of the subject to acquire image data of the still image.

Then, when the mode operation unit 24 is pressed by the user in the shooting mode, the imaging device 1 switches the operation mode to the playback mode. The playback mode is an operation mode for playing back content data. Therefore, after switching the operation mode to the playback mode, the imaging device 1 generates an index screen I for the user to select content data to be played back.

Figure 5:
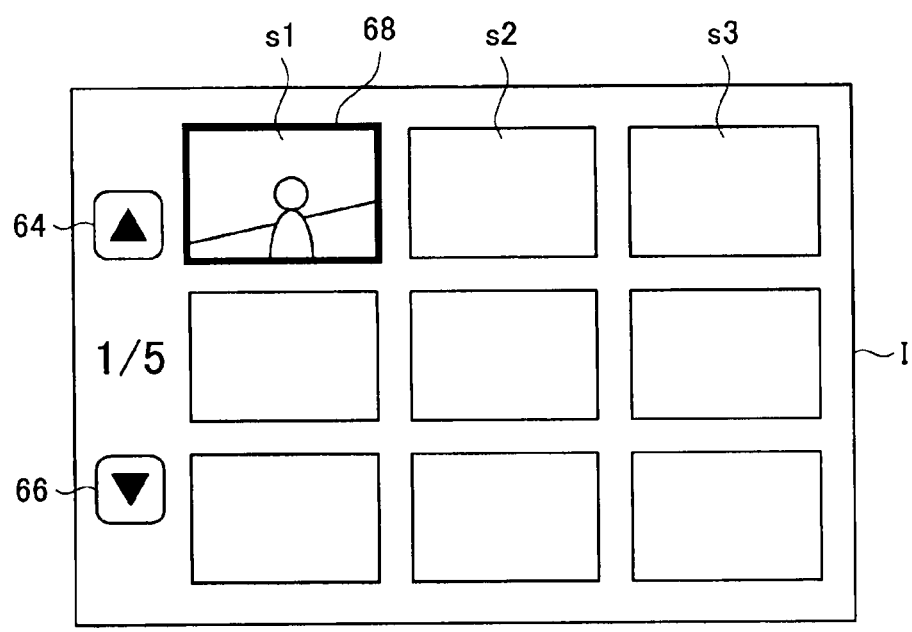
FIG. 5 is an explanatory diagram showing a specific example of an index screen.

FIG. 5 is an explanatory diagram showing a specific example of the index screen I. As shown in FIG. 5, the index screen I includes thumbnails s1, s2, s3, . . . each corresponding to a plurality of pieces of content data. Note that the content data can be image data acquired by the imaging device 1 through imaging or image data acquired from the outside. In addition, the data type of the content data is not limited to image data, and the data type of the content data can be audio data, game, software, or the like. In addition, each thumbnail s can be either a still image or a moving image.

The index screen I includes an upward scroll button 64 and a downward scroll button 66. The user is able to scroll on the index screen I in any direction by selecting the upward scroll button 64 or the downward scroll button 66.

In addition, the user is able to select content data to be played back by placing a cursor 68 over a desired thumbnail on the index screen I. Then, when content data to be selected is determined by the user, the imaging device 1 starts playing back the selected content data and generates a playback screen of the content data.

Figure 6:
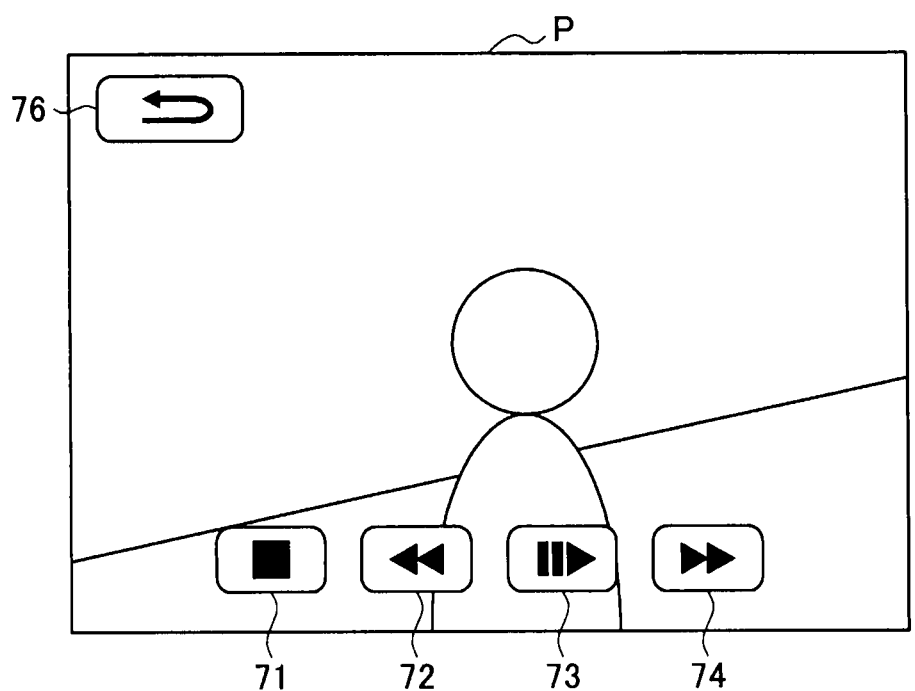
FIG. 6 is an explanatory diagram showing a specific example of a playback screen.

FIG. 6 is an explanatory diagram showing a specific example of the playback screen P of the content data. As shown in FIG. 6, the playback screen P of the content data includes a stop button 71, a fast-rewind button 72, a play/pause button 73, a fast-forward button 74, and a return button 76.

When the stop button 71, the fast-rewind button 72, the play/pause button 73, or the fast-forward button 74 is selected by the user, the imaging device 1 controls playback of the content data in accordance with the selected button. For example, when the stop button 71 is selected by the user, the imaging device 1 stops playback of the content data. In addition, when the return button 76 is selected by the user, the imaging device 1 stops playback of the content data, and generates the index screen I.

Although description has been made above of an example in which switching between the shooting mode and the playback mode is performed in accordance with a user's operation on the mode operation unit 24, the trigger to switch the mode is not limited thereto. For example, a button for switching the operation mode to the playback mode can be added to the imaging screen R so that the imaging device 1 can, when the button for switching the operation mode to the playback mode is selected by the user, switch the operation mode to the playback mode. Likewise, a button for switching the operation mode to the shooting mode can be added to the index screen I or the playback screen P so that the imaging device 1 can, when the button for switching the operation mode to the shooting mode is selected by the user, switch the operation mode to the shooting mode.

The configuration of the index screen I is not limited to the example shown in FIG. 5. For example, the index screen I can be a screen in which a thumbnail of image data is overlaid on a position associated with the image data on a map (e.g., imaging position), or a screen in which a thumbnail of image data is overlaid on a position associated with the image data on the time axis (e.g., imaging date and time).

In addition, the imaging device 1 in the playback mode can display the aforementioned index screen I or playback screen P on the touch panel 12, and can also project such screen from the projector module 50 of the cradle 5.

[1-3. Configuration and Operation of Imaging Device and Cradle in Accordance with First Embodiment]

(Configuration of Imaging Device)

Figure 7:
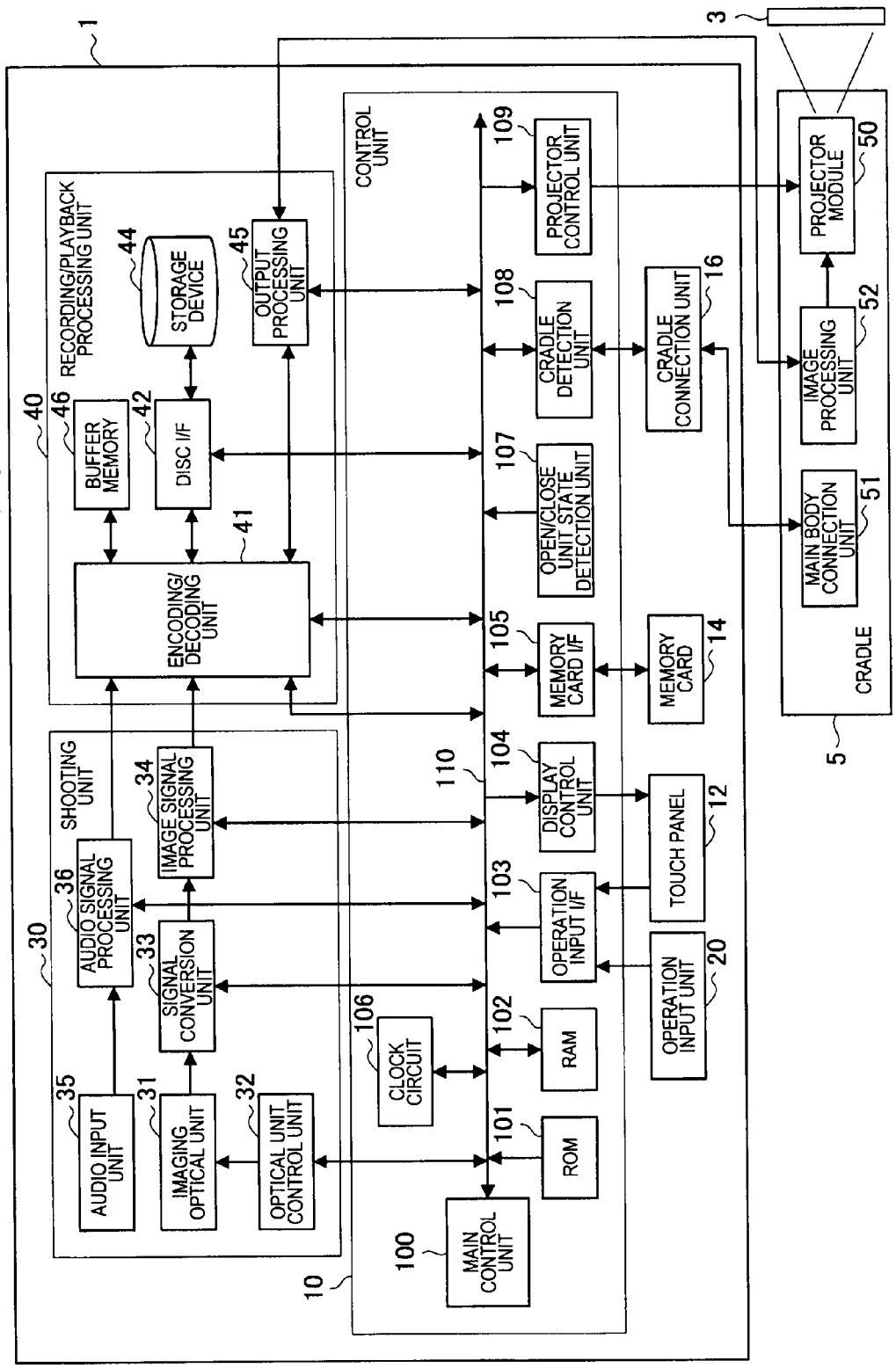
FIG. 7 is a block diagram showing the configuration of the imaging device in accordance with the first embodiment of the present disclosure.

FIG. 7 is a block diagram showing the configuration of the imaging device 1 in accordance with the first embodiment of the present disclosure. As shown in FIG. 7, the imaging device 1 in accordance with the first embodiment of the present disclosure includes the control unit 10, the imaging unit 30, and a recording/playback processing unit 40.

The shooting unit (imaging unit) 30 includes the imaging optical unit 31, an optical unit control unit 32, a signal conversion unit 33, an image signal processing unit 34, an audio input unit 35, and an audio signal processing unit 36.

The imaging optical unit 31 includes a lens group for imaging a subject, a diaphragm adjustment mechanism, a focus adjustment mechanism, a zoom mechanism, a shutter mechanism, a flash mechanism, a shake correction mechanism, and the like, and forms an image of the subject at the signal conversion unit 33.

The optical unit control unit 32, upon receiving a control signal from the control unit 10, generates a control signal to be supplied to the imaging optical unit 31. Then, the optical unit control unit 32 supplies the generated control signal to the imaging optical unit 31 and performs control such as zoom control, shutter control, and exposure control.

The signal conversion unit 33 includes, for example, an image sensor such as a CCD or a CMOS as described above. The signal conversion unit 33, when supplied with an image acquisition timing signal from the control unit 10 on the basis of a user's operation on the operation input unit 20, converts an image of the subject, which has been formed on an imaging plane by the imaging optical unit 31, into an electrical image signal, and supplies it to the image signal processing unit 34. In the shooting mode, image acquisition timing signals are continuously supplied from the control unit 10. Thus, the signal conversion unit 33 acquires image signals of a plurality of frames by continuously converting image signals of the subject.

The image signal processing unit 34, on the basis of a control signal from the control unit 10, performs processes such as gamma correction and AGC (Auto Gain Control) on the image signal, and also performs a process of converting the image signal into a digital format.

The audio input unit 35 collects sound around the subject in the shooting mode. The audio input unit 35 converts the collected sound into an electrical audio signal, and supplies it to the audio signal processing unit 36. The audio signal processing unit 36, on the basis of a control signal from the control unit 10, performs processes such as correction or AGC on the audio signal, and also performs a process of converting the audio signal into a digital format.

The recording/playback processing unit 40 includes an encoding/decoding unit 41, a disc interface 42, a storage device 44, an output processing unit 45, and buffer memory 46 as shown in FIG. 7, and functions as a playback unit and a recording unit.

The encoding/decoding unit 41 has an encoding function in which an image signal and an audio signal supplied from the shooting unit 30 and additional recording information such as time information are encoded and multiplexed using a MPEG scheme or the like, and then converted into compressed data including image data and audio data.

Meanwhile, the encoding/decoding unit 41 also has a decoding function (a playback function) in which image data and audio data are separated from the compressed data, and then the image data and the audio data are decoded into an image signal and an audio signal (a playback processing unit).

In addition, the encoding/decoding unit 41 further performs, on the basis of a control signal from the control unit 10, automatic white balance control, exposure correction control, magnification control in accordance with digital zoom magnification, and the like on the image signal supplied from the image signal processing unit 34.

The disc interface 42 writes the compressed data supplied from the encoding/decoding unit 41 into the storage device 44. In addition, the disc interface 42 reads the compressed data from the storage device 44 and supplies it to the encoding/decoding unit 41. Note that the storage device 44 can be an optical disc such as DVD-R (Digital Versatile Disc Recordable) or BD (Blu-Ray Disc®).

The output processing unit 45 is controlled by a main control unit 100 via a system bus 110. In addition, the output processing unit 45 supplies the compressed data supplied from the encoding/decoding unit 41 to the control unit 10 and an image processing unit 52 of the cradle 5. The compressed data can be supplied to the cradle 5 either via short-range radio communication or, when a cradle connection unit 16 and a main body connection unit 51 of the cradle 5 described below are electrically connected, via the connection path.

The buffer memory 46 includes, for example, SDRAM and is used as a work area for performing encoding or decoding with the encoding/decoding unit 41.

The control unit 10 is configured such that, as shown in FIG. 7, the main control unit 100, ROM (Read Only Memory) 101, RAM (Random Access Memory) 102, an operation input interface 103 that receives an operation input from the operation input unit 20 or from the touch panel 12, a display control unit 104 that controls the touch panel 12, a memory card interface 105 to be loaded with a memory card 14, a clock circuit 106 that generates time information for use in the recording of the shooting time or the like, and a projector control unit 109 that controls the projector module 50 of the cradle 5 are connected via the system bus 110. Note that the configuration of the imaging device 1 in accordance with this embodiment is not limited to that shown in FIG. 7, and the imaging device 1 can also include a projector module and such projector module can be controlled with the projector control unit 109.

The main control unit 100 manages the processing of the entire imaging device 1, and uses the RAM 102 as a work area. In addition, the main control unit 100 performs control in accordance with an operation mode specified through a user's operation on the mode operation unit 24.

For example, when the operation mode is the shooting mode, the main control unit 100 stops power supply to the projector control unit 109, and causes the touch panel 12 to display an image signal supplied from the image signal processing unit 34 via the display control unit 104.

Meanwhile, when the operation mode is the playback mode, the main control unit 100 stops power supply to the shooting unit 30, and generates the playback screen P or the index screen I on the basis of a playback signal or thumbnails of image data supplied from the encoding/decoding unit 41, and further causes the touch panel 12 to display the playback screen P or the index screen I via the display control unit 104.

In the ROM 101, a program for controlling the shooting unit 30 and a program for executing recording control, playback control, and the like on image signals and audio signals are written.

The operation input interface 103 transmits operation signals from the connected operation input unit 20 and touch panel 12 to the main control unit 100. Note that the zoom operation unit 21, the manual operation unit 22, the still image capturing operation unit 23, the mode operation unit 24, the projection switching operation unit 25, and the like are collectively referred to as the operation input unit 20.

The display control unit 104 performs control for displaying on the touch panel 12 the image signal supplied from the image signal processing unit 34, the playback screen P or the index screen I generated by the main control unit 100, and the like.

The memory card interface 105 writes the compressed data supplied from the encoding/decoding unit 41 to the memory card 14. In addition, the memory card interface 105 reads the compressed data from the memory card 14 and supplies it to the encoding/decoding unit 41.

The clock circuit 106 generates time information representing the year, month, date, time, hour, minute, second, and the like.

An open/close unit state detection unit 107 detects the state of the open/close unit 8 with respect to the main body unit 4. Specifically, the open/close unit state detection unit 107 detects if the open/close unit 8 is in a state of being closed or open with respect to the main body unit 4 around the first rotation axis L1 as the center, and further detects if the touch panel 12 is in a state of facing inward or outward around the second rotation axis L2 as the center. The open/close unit state detection unit 107 can also detect the open/closed state using a magnetic sensor that is provided on the main body unit 4 and detects proximity to a magnet provided on the open/close unit 8. Alternatively, the open/close unit state detection unit 107 can detect the open/closed state by detecting the angle of the open/close unit 8 using an angle sensor provided on the main body unit 4.

The cradle detection unit 108 detects if the main body unit 4 has been placed on the cradle 5. Specifically, the cradle detection unit 108 detects that the main body unit 4 has been placed on the cradle 5 when the main body connection unit 51 of the cradle 5 is connected to the cradle connection unit 16 provided on the main body unit 4.

The cradle connection unit 16 is a connector provided at a position to be connected to the main body connection unit 51 of the cradle 5 when the main body unit 4 is placed on the cradle 5. The cradle connection unit 16 allows data transfer between the imaging device 1 and the cradle 5 by being electrically connected to the main body connection unit 51.

The projector control unit 109 performs control for projecting a screen onto a projection screen 3 from the projector module 50 of the cradle 5. The playback screen P or the index screen I, for example, is projected onto the projection screen 3 from the projector module 50 on the basis of the control of the projector control unit 109. In particular, the projector control unit 109 controls the start of projection in accordance with the direction that the touch panel 12 faces.

For example, when the user has placed the imaging device 1 on the cradle 5 shown in FIG. 1, he/she puts the open/close unit 8 into a state of being closed with respect to the main body unit 4 with the touch panel 12 facing outward (a flipped storage state) in order to perform an operation of selecting a projection screen or perform playback, stop, fast-forward, or the like. When the projection direction and the direction that the touch panel 12 faces are set opposite to each other as described above, it becomes possible for the user to concurrently view the operation screen and the projection screen, and thus to easily operate them. Thus, in this embodiment, a case in which the open/close unit 8 is moved by the user and the touch panel 12, which is provided on the open/close unit 8, is positioned such that it faces a direction opposite to the projection direction is used as a trigger to start projection, whereby it becomes possible to reduce the burden of the complex operation for starting projection.

(Configuration of Cradle)

As shown in FIG. 7, the cradle 5 in accordance with the first embodiment of the present disclosure includes the projector module 50, the main body connection unit 51, and the image processing unit 52.

The projector module 50 is a projection unit that projects a screen generated by the imaging device 1 and corrected by the image processing unit 52 for projection purposes. The projector module 50 can project an index screen, a playback screen, or the like described below, for example. The detailed configuration of the projector module 50 is described below with reference to FIG. 8.

The main body connection unit 51 is a connector provided at a position to be connected to the cradle connection unit 16 of the imaging device 1 when the imaging device 1 is placed on the cradle 5. The main body connection unit 51 allows data transfer between the imaging device 1 and the cradle 5 by being electrically connected to the cradle connection unit 16.

The image processing unit 52 performs adequate correction to the image generated by the encoding/decoding unit 41 of the imaging device 1 and sent from the output processing unit 45, and thus generates an image for projection. If the sent image has been subjected to a compression process, the image processing unit 52 processes the image after performing a decompression process, and thus generates an image for projection.

Figure 8:
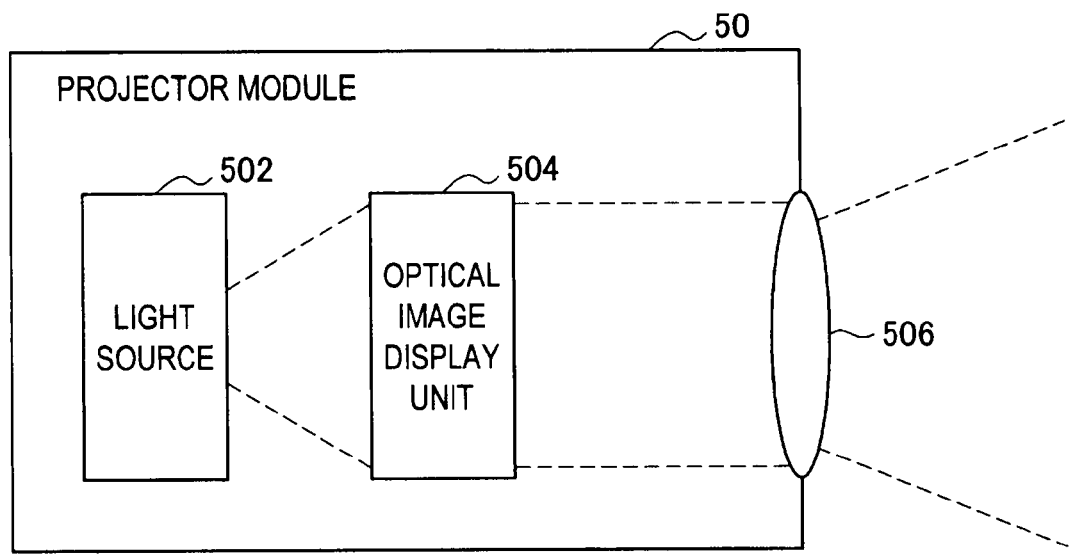
FIG. 8 is an explanatory diagram showing the configuration of a projector module.

Next, the detailed configuration of the projector module 50 will be described with reference to FIG. 8. FIG. 8 is an explanatory diagram showing the configuration of the projector module 50. As shown in FIG. 8, the projector module 50 includes a light source 502, an optical image display unit 504, and a projection lens 506.

The light source 502 includes white LED (Light Emitting Diode) that emits white light, and an optical unit that diffuses the light emitted from the white LED and shines the light onto the optical image display unit 504. Although this embodiment mainly describes an example in which the light source 502 includes white LED, the configuration of the light source 502 is not limited thereto. For example, the light source 182 can include a high-pressure mercury lamp.

The optical image display unit 504 is a liquid crystal panel that displays a screen for projection. The screen displayed on the optical image display unit 504 is supplied to the projection lens 506 by the light emitted from the light source 502. The projection lens 506 forms an image of the screen, which is displayed on the optical image display unit 504, on the projection screen.

(Operation of Imaging Device)

Figure 9:
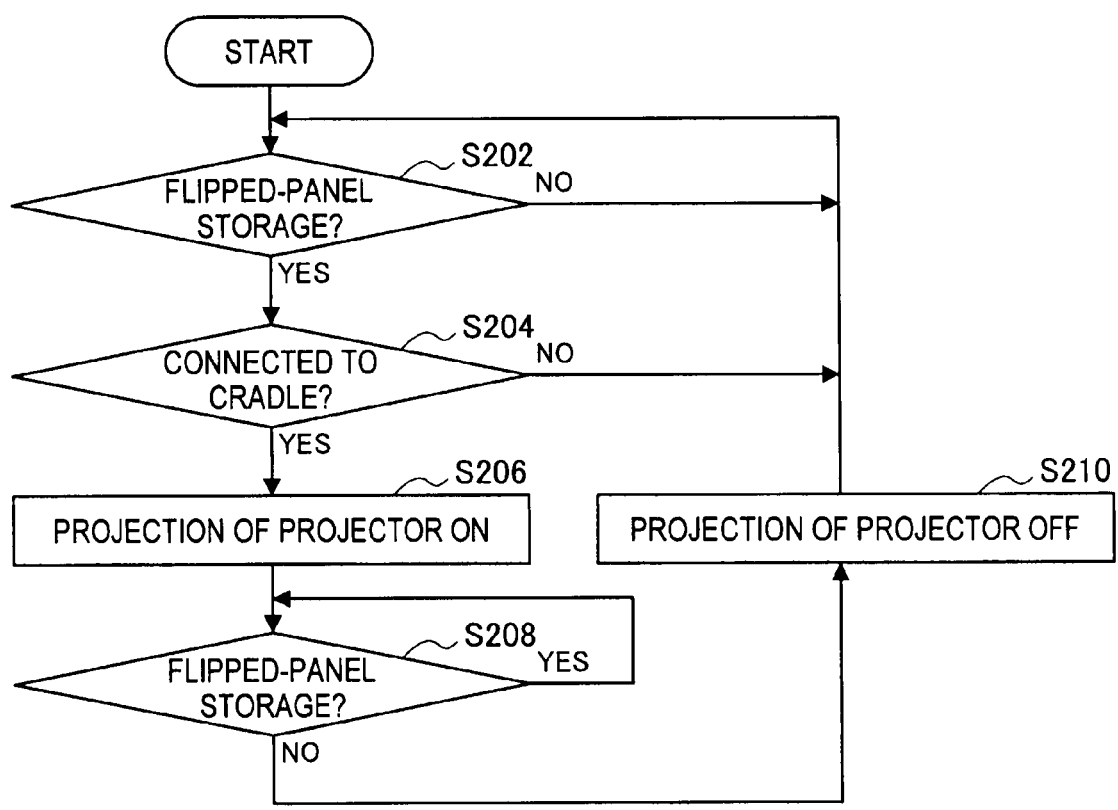
FIG. 9 is a flowchart showing the operation process of the imaging device in accordance with the first embodiment of the present disclosure.
Figure 10:
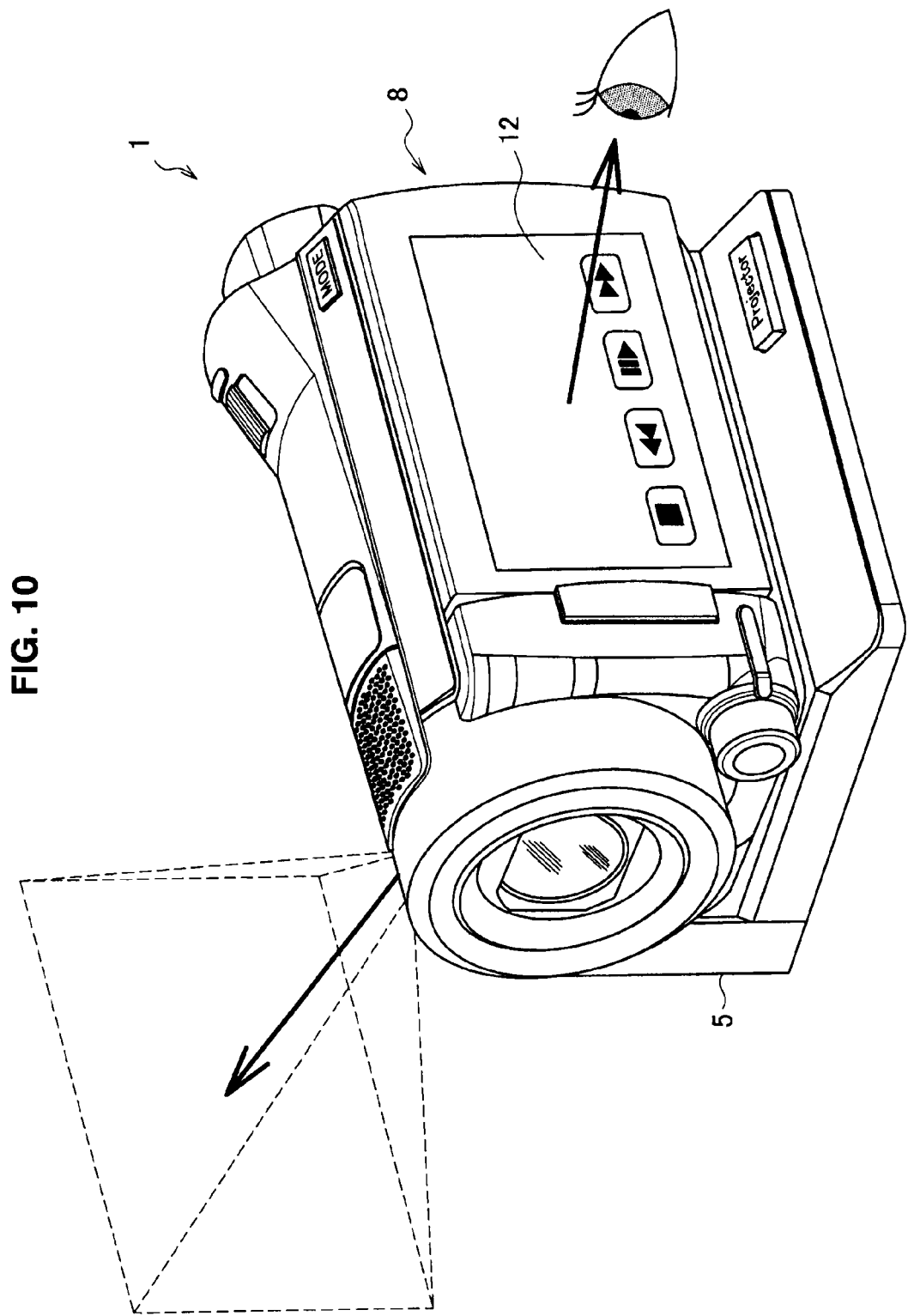
FIG. 10 is a diagram illustrating the direction that an operation unit of the imaging device faces and projection start control in accordance with the first embodiment of the present disclosure.

Next, the operation of the imaging device 1 in accordance with this embodiment will be described with reference to FIGS. 9 and 10. FIG. 9 is a flowchart showing the operation process of the imaging device 1 in accordance with this embodiment. FIG. 10 is a diagram illustrating the state of the open/close unit when the imaging device 1 in accordance with this embodiment is placed on the cradle 5 and projection from the projector module 50 of the cradle 5 starts.

As shown in FIG. 9, when the open/close unit state detection unit 107 has detected a state in which the open/close unit

8 is closed with respect to the main body unit 4 with the touch panel 12 facing outward (flipped-panel storage) (step S202/Yes), and the cradle detection unit 108 has detected that the cradle connection unit 16 is connected to the main body connection unit 51 of the cradle 5 (step S204/Yes), the main control unit 100 instructs the projector control unit 109 to control projection. The projector control unit 109, upon receiving such instruction, projects a screen from the projector module 50 of the cradle 5 (step S206).

As described above, in this embodiment, projection is started when the imaging device 1 is placed on the cradle in a state in which the open/close unit 8 is closed with respect to the main body unit 4 with the touch panel 12 facing outward (flipped-panel storage). In this case, as described above, the direction (D1) that the touch panel 12 faces is opposite to the projection direction (D2) of the projector module 50 as shown in FIG. 10. Thus, the user is able to concurrently view the operation screen and the projection screen, and thus to easily operate them. Thus, a case in which the open/close unit 8 is moved by the user and the touch panel 12, which is provided on the open/close unit 8, is positioned such that it faces a direction opposite to the projection direction is used as a trigger to start projection, whereby it becomes possible to reduce the burden of the complex operation for starting projection.

Next, when the open/close unit state detection unit 107 has detected a state in which the open/close unit 8 is open with respect to the main body unit 4 (an open state) or a state in which the open/close unit 8 is closed with respect to the main body unit 4 with the touch panel 12 facing inward (a closed state) (step S208/No), the main control unit 100 instructs the projector control unit 109 to perform control for terminating the projection. The projector control unit 109, upon receiving such instruction, terminates the projection from the projector module 50 of the cradle 5 (step S210).

(Operation of Cradle)

Next, the operation of the cradle will be described. The image processing unit 52 of the cradle 5 processes an image sent from the imaging device 1 for projection purposes, and sends the generated screen for projection to the projector module 50. The projector module 50, when instructed from the imaging device 1 to start projection, displays the screen for projection on the optical image display unit 504 and supplies the screen for projection to the projection lens 506 using the light emitted from the light source 50. The projection lens 506 forms an image of the screen for projection displayed on the optical image display unit 504 on the projection screen. In this manner, the projector module 50 performs projection in accordance with an instruction from the imaging device 1 to start projection.

Next, the projector module 50, when instructed from the imaging device 1 to terminate the projection, turns off the irradiation from the light source 502 to terminate the projection. Note that when the main body connection unit 51 has detected that the main body unit 4 of the imaging device 1 had been removed from the cradle 5, the projector module 50 terminates the projection.

2. SECOND EMBODIMENT

Next, a projection system in accordance with the second embodiment of the present disclosure will be described. The cradle 5 in accordance with this embodiment is, as shown in FIG. 11, provided with the projector module 50 at a position where projection is performed in the same direction as the direction that the placed imaging device 1 faces.

Figure 11:
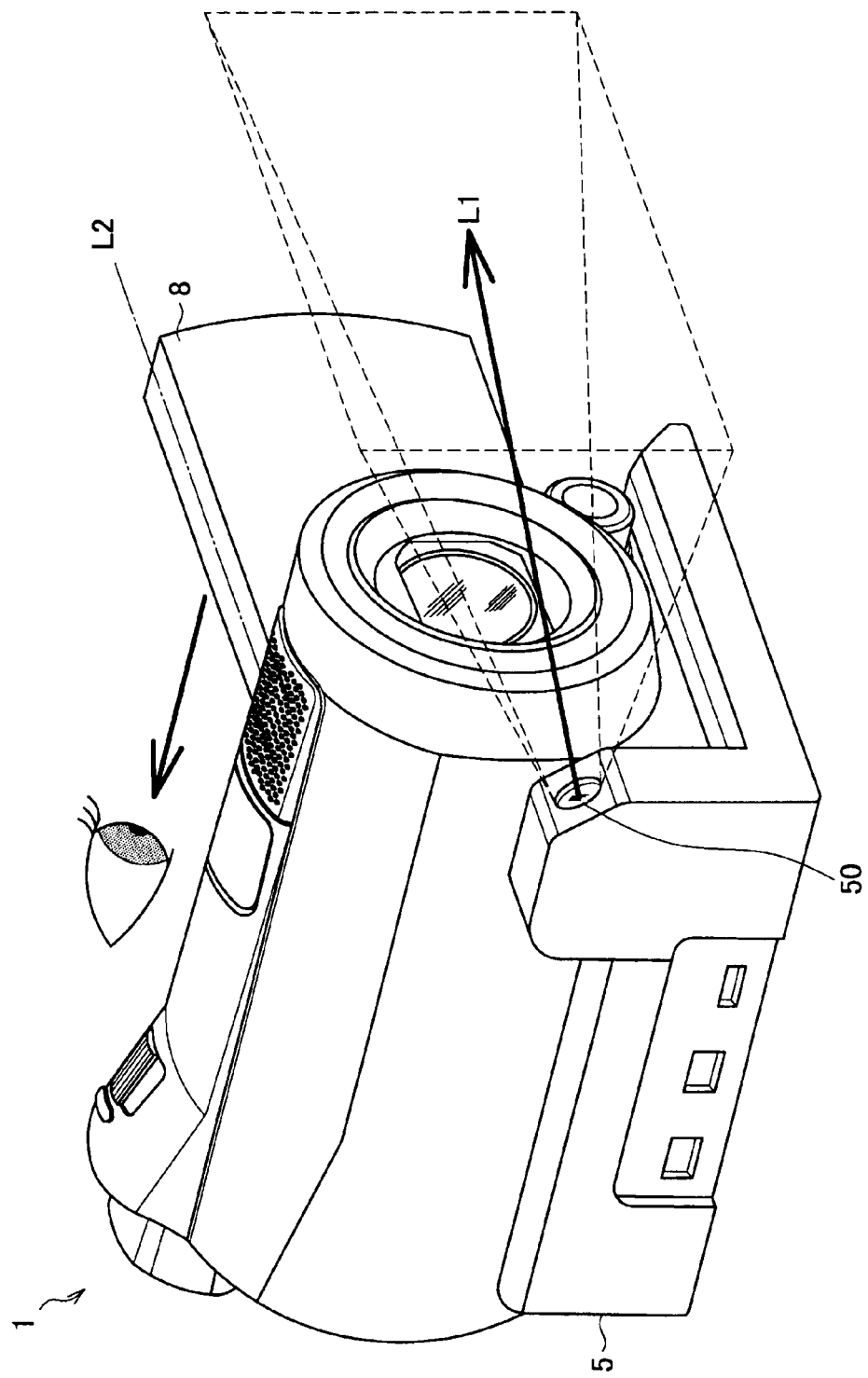
FIG. 11 is a diagram illustrating the direction that an operation unit of an imaging device faces and projection start control in accordance with the second embodiment of the present disclosure.

In this case, as shown in FIG. 11, the user puts the open/close unit 8 into a state of being open with respect to the main body unit 4 with the touch panel 12 facing inward (an open state) to perform an operation of selecting a projection screen or perform playback, stop, fast-forward, or the like. When the projection direction and the direction that the touch panel 12 faces are set opposite to each other as described above, it becomes possible for the user to concurrently view the operation screen and the projection screen, and thus to easily operate them. Thus, in this embodiment, a case in which the open/close unit 8 is moved by the user and the touch panel 12, which is provided on the open/close unit 8, is positioned such that it faces a direction opposite to the projection direction is used as a trigger to start projection, whereby it becomes possible to reduce the burden of the complex operation for starting projection.

Note that while a screen generated by the imaging device 1 is projected from the projector module 50, the touch panel 12 can display the same screen as the projection screen, display a screen that is different from the projection screen, or display no screen.

Description of the configurations of the imaging device 1 and the cradle 5 in accordance with this embodiment will be omitted as they are similar to the configurations of the imaging device 1 and the cradle 5 shown in the aforementioned first embodiment except that the projection direction of the cradle 5 faces forward as shown in FIG. 11.

(Operation of Imaging Device)

Figure 12:
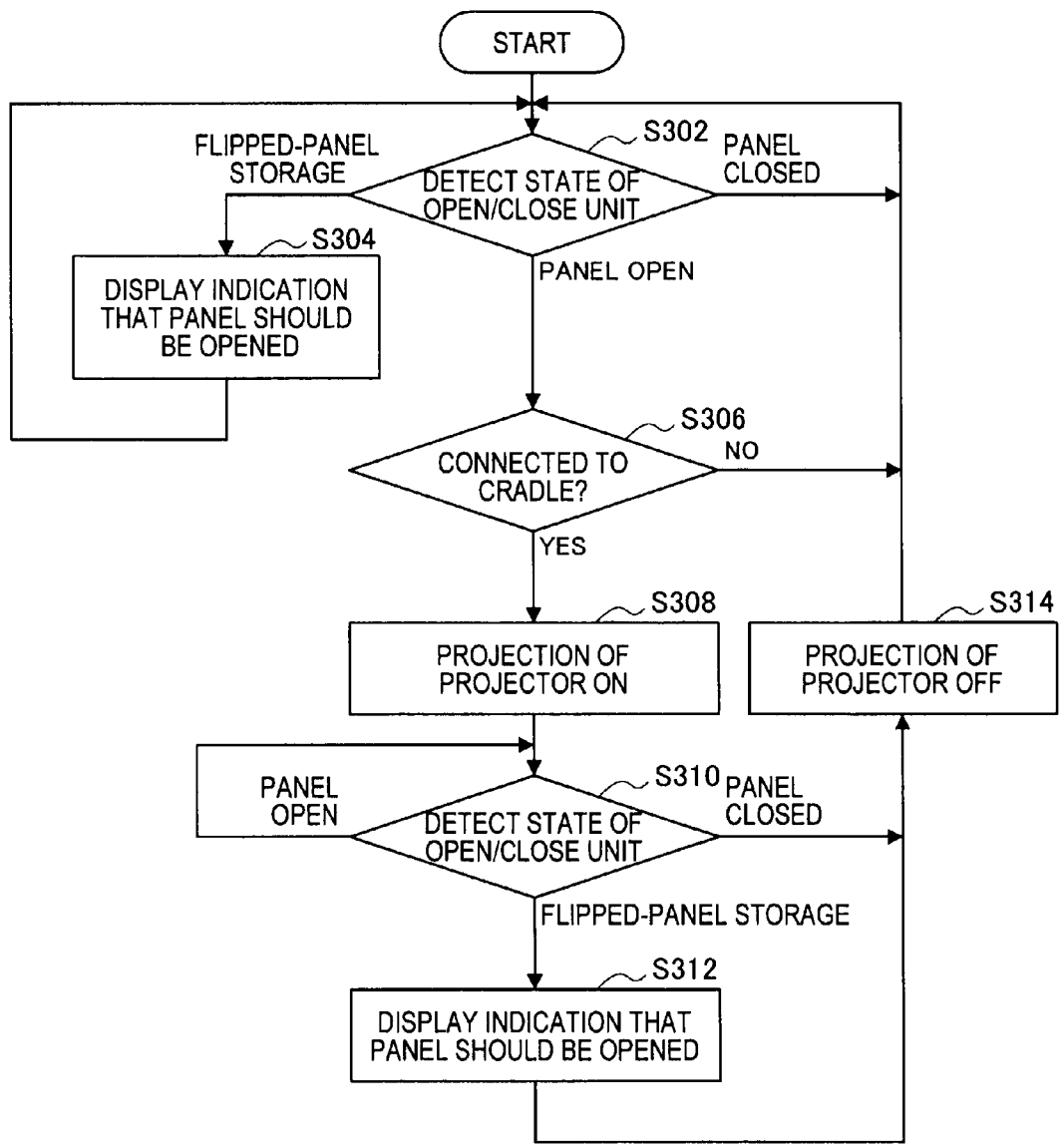
FIG. 12 is a flowchart showing the operation process of the imaging device in accordance with the second embodiment of the present disclosure.

Next, a projection control process of the imaging device 1 in accordance with this embodiment will be described with reference to FIG. 12. FIG. 12 is a flowchart showing the operation process of the imaging device 1 in accordance with this embodiment.

As shown in FIG. 12, when the open/close unit state detection unit 107 has detected a state in which the open/close unit 8 is open with respect to the main body unit 4 with the touch panel facing inward (a panel open state) (step S302/Panel Open State), and the cradle detection unit 108 has detected that the cradle connection unit 16 is connected to the main body connection unit 51 of the cradle 5 (step S306/Yes), the main control unit 100 instructs the projector control unit 109 to perform projection control. The projector control unit 109, upon receiving such instruction, projects a screen from the projector module 50 of the cradle 5 (step S308).

As described above, in this embodiment, projection is started when the imaging device 1 is placed on the cradle in a state in which the open/close unit 8 is open with respect to the main body unit 4 with the touch panel 12 facing inward (a panel open state). In this case, the direction (D1) that the touch panel 12 faces is opposite to the projection direction (D2) of the projector module 50 as shown in FIG. 12. Thus, the user is able to concurrently view the touch panel 12 on which he/she performs an operation and the projection screen, and thus to easily operate them. Thus, in this embodiment, a case in which the open/close unit 8 is moved by the user and the touch panel 12, which is provided on the open/close unit 8, is positioned such that it faces a direction opposite to the projection direction is used as a trigger to start projection, whereby it becomes possible to reduce the burden of the complex operation for starting projection.

Meanwhile, when the open/close unit state detection unit 107 has detected a state in which the open/close unit 8 is closed with respect to the main body unit 4 with the touch panel 12 facing outward (flipped-panel storage) (step S302/Flipped-Panel Storage), the main control unit 100 can display conditions for starting projection on the touch panel 12. In this case, information to the effect that the open/close unit 8 should be put into a state of being open with respect to the main body unit 4 with the touch panel 12 facing inward (panel open state) is displayed on the touch panel 12 (step S304).

Next, when the open/close unit state detection unit 107 has detected a state in which the open/close unit 8 is closed with respect to the main body unit 4 with the touch panel 12 facing inward (closed state) (step S310/Panel Closed), the main control unit 100 instructs the projector control unit 109 to perform control for terminating the projection. The projector control unit 109, upon receiving such instruction, terminates the projection from the projector module 50 of the cradle 5 (step S314).

Meanwhile, when the open/close unit state detection unit 107 has detected a state in which the open/close unit 8 is closed with respect to the main body unit 4 with the touch panel facing outward (flipped-panel storage) (step S310/Flipped-Panel Storage), the main control unit 100 can display conditions for starting projection on the touch panel 12. In this case, information to the effect that the open/close unit 8 should be put into a state of being open with respect to the main body unit 4 with the touch panel 12 facing inward (panel open state) is displayed on the touch panel 12 (step S312).

Next, the main control unit 100 instructs the projector control unit 109 to perform control for terminating the projection. The projector control unit 109, upon receiving such instruction, terminates the projection from the projector module 50 of the cradle 5 (step S314).

3. THIRD EMBODIMENT

Next, a projection system in accordance with the third embodiment of the present disclosure will be described. The cradles 5 in accordance with the aforementioned embodiments differ in the projection direction of the projector modules 50 as shown in FIGS. 10 and 11. Suppose a case in which a plurality of cradles 5 are present that differ in the projection direction of the projector modules 50 as described above, it would be impossible for the imaging device 1 to perform the aforementioned projection start control if it cannot determine which direction that the touch panel 12 faces is opposite to the projection direction of the cradle 5.

Herein, the imaging device 1 in accordance with this embodiment acquires from the connected cradle 5 an ID that is the identification information for identifying the cradle 5. Using such ID, the main control unit 100 can determine which direction that the touch panel 12 faces is opposite to the projection direction of the cradle 5.

Hereinafter, projection control of the imaging device 1 in accordance with this embodiment will be described, assuming a case of using two IDs shown in FIG. 13. ID1 shown in FIG. 13 is the ID representing the cradle 5 shown in FIG. 10. Meanwhile, ID2 shown in FIG. 13 is the ID representing the cradle 5 shown in FIG. 11.

In the table shown in FIG. 13, a case in which the main control unit 100 issues an instruction to perform projection start control is indicated by ○, a case in which projection start conditions are displayed on the touch panel 12 is indicated by Δ, and a case in which the main control unit 100 does not issue an instruction to perform projection start control and a case in which the main control unit 100 issues an instruction to perform projection termination control are indicated by x.

(Operation of Imaging Device 1)

Figure 14:
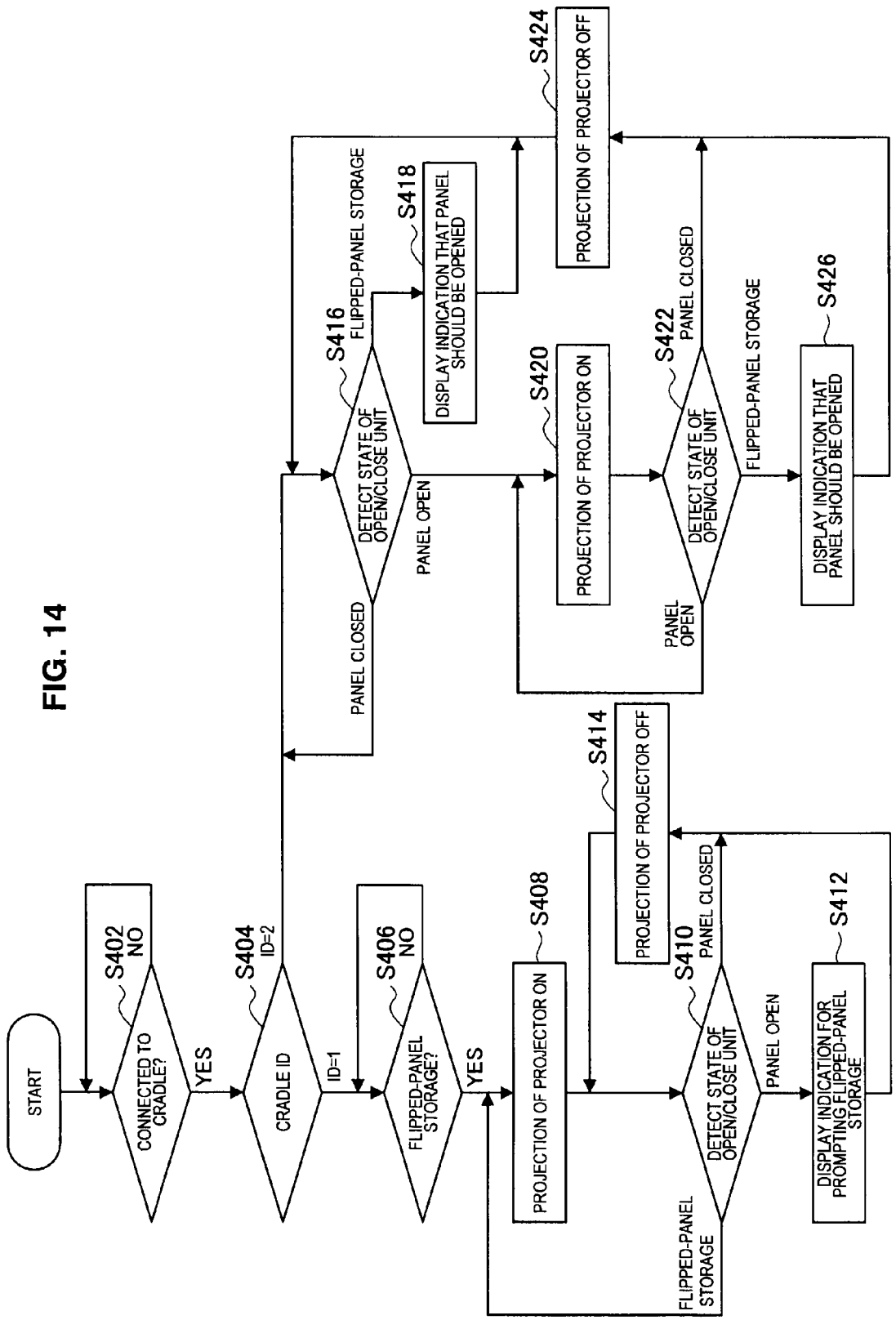
FIG. 14 is a flowchart showing the operation process of the imaging device in accordance with the third embodiment of the present disclosure.

Next, a projection control process of the imaging device 1 in accordance with this embodiment will be described with reference to FIG. 14. FIG. 14 is a flowchart showing the operation process of the imaging device 1 in accordance with this embodiment.

As shown in FIG. 14, when the cradle detection unit 108 has detected that the cradle connection unit 16 is connected to the main body connection unit 51 of the cradle 5 (step S402/Yes), the imaging device 1 acquires an ID from the cradle 5. The ID can be acquired by the cradle connection unit 16 that is electrically connected to the main body connection unit 51 of the cradle 5.

Next, the main control unit 100 performs the projection control in accordance with Embodiment 1 described above or the projection control in accordance with Embodiment 2 described above according to the type of the ID.

Herein, a process performed when the ID1 is acquired (step S404/ID1) in the projection control shown in FIG. 14 includes, in addition to the projection control in accordance with Embodiment 1 described above (see FIG. 9), a step of displaying the projection start conditions when the open/close unit 8 is open (steps S410 and S412).

Meanwhile, a process performed when the ID2 is acquired (step S404/ID2) is similar to the projection control in accordance with Embodiment 2 described above (see FIG. 12).

4. FOURTH EMBODIMENT

Further, a projection system that includes the cradle 5 whose projection direction is changed to a plurality of directions and an imaging device 1 is proposed as another embodiment of the present disclosure. The cradle 5 in accordance with this embodiment is provided with, for example, projection lenses 506 at a plurality of positions so that output light for sending a projection image from the optical image display unit 504 is guided to each projection lens 506 using a mirror, whereby the projection direction is changed to a desired direction.

In this case, the imaging device 1 performs projection control on the basis of the relationship between the projection direction of the cradle 5 and the direction that the touch panel 12 faces such that projection of a screen is performed when the direction that the touch panel 12 faces is opposite to the projection direction of the projector module 50. The projection direction of the cradle 50 can be determined from the ID acquired from the cradle 5, for example.

5. CONCLUSION

As described above, the imaging device 1 in accordance with the embodiments of the present disclosure performs projection control such that projection of a screen is performed when the direction (D1) that the touch panel 12 faces is opposite to the projection direction (D2) of the projector module 50. Thus, it is possible to reduce the burden of the complex operation for starting projection, and to simplify the operation for starting the projection.

In addition, it is also possible to perform projection control such that projection of a screen is performed when the open/closed state of the open/close unit 8 is a predetermined state in accordance with the ID acquired from the cradle.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the steps in the process of the imaging device 1 in this specification need not necessarily be processed in a time-series order in accordance with the order described in the flowchart. For example, steps S202 and 204 in the process of the imaging device 1 shown in FIG. 9 can be performed in an order different from that described in the flowchart, or be processed in parallel.

It is also possible to create a computer program for causing built-in hardware in the imaging device 1 to exert a function that is equivalent to each configuration of the aforementioned imaging device 1. In addition, a storage medium having the computer program stored therein is also provided.

What is claimed is:

1. An information processing apparatus, comprising:
   a main body;
   a member movably attached in an least first and second axial directions with respect to the main body;
   a first detector configured to detect an orientation of the member with respect to the main body;
   a second detector configured to detect whether the main body is connected to a cradle apparatus; and
   a processor configured to output a command for controlling an operation of a projection device based on an output of the first and second detectors, wherein
   the member includes a display on a surface of the member,
   the first detector is configured to detect whether the member is in an open or a closed state with respect to the main body in relation to the first axial direction,
   the first detector is configured to detect whether the surface of the member including the display is facing inward or outward with respect to the main body in relation to the second axial direction, and
   the processor outputs a command controlling the projection device to project an image when an output of the first detector indicates that the member is in the closed state and the display is facing outward and an output of the second detector indicates that the main body is connected to the cradle.

2. The information processing apparatus of claim 1, wherein the information processing apparatus is a video camera, a personal computer, a personal digital assistant, a home game machine, a portable phone, a portable music playback device, a portable image processing device or a portable game machine.

3. The information processing apparatus of claim 1, wherein the projection device is included in the cradle apparatus.

4. The information processing apparatus of claim 1, wherein the first detector is a magnetic sensor configured to detect the open state or the closed state of the member with respect to the main body by detecting a proximity of a magnet included in the member to the magnetic sensor.

5. The information processing apparatus of claim 1, wherein the first detector is an angle sensor configured to detect the open state or the closed state of the member with respect to the main body by detecting an angle of the member with respect to the main body.

6. The information processing apparatus of claim 1, wherein the display is a touch-panel interface.

7. The information processing apparatus of claim 1, further comprising:
   an interface configured to connect to the cradle apparatus, wherein the second detector is configured to detect whether the main body is connected to the cradle apparatus by determining whether the interface is connected to the cradle apparatus.

8. The information processing apparatus of claim 1, wherein the processor is configured to output a command controlling the projection device to stop projecting the image when an output of the first detector indicates that the member has changed from the closed state to the open state.

9. The information processing apparatus of claim 1, wherein the processor outputs a command controlling the projection device to project an image when an output of the first detector indicates that the member is in the open state and an output of the second detector indicates that the main body is connected to the cradle.

10. The information processing apparatus of claim 9, wherein the processor is configured to output a command controlling the projection device to stop projecting the image when an output of the first detector indicates that the member has changed from the open state to the closed state with respect to the main body.

11. An information processing apparatus comprising:
    a main body;
    a member movably attached in an least first and second axial directions with respect to the main body;
    a first detector configured to detect an orientation of the member with respect to the main body;
    a second detector configured to detect whether the main body is connected to a cradle apparatus; and
    a processor configured to output a command for controlling an operation of a projection device based on an output of the first and second detectors, wherein
    the member includes a display on a surface of the member,
    the first detector is configured to detect whether the member is in an open or a closed state with respect to the main body in relation to the first axial direction,
    the first detector is configured to detect whether the surface of the member including the display is facing inward or outward with respect to the main body in relation to the second axial direction, and
    the processor outputs a command controlling the projection device to project an image when an output of the first detector indicates that the member is in the open state and the display is facing inward and an output of the second detector indicates that the main body is connected to the cradle.

12. The information processing apparatus of claim 6, further comprising:
    an interface configured to connect to the cradle apparatus, wherein the interface is configured to receive an identification corresponding to the cradle apparatus upon being connected to the cradle apparatus.

13. The information processing apparatus of claim 12, further comprising:
    a memory configured to store projection start conditions indicating an orientation of the touch-panel interface with respect to the main body to initiate a projection operation.

14. The information processing apparatus of claim 13, wherein the processor is configured to control the touch-panel interface to display information corresponding to the projection start conditions.

15. The information processing apparatus of claim 6, wherein the processor is configured to control the projection device to display information displayed on the touch-panel interface or information different from that displayed on the touch panel interface.

16. An information processing method performed by an information processing apparatus, the method comprising:
    detecting, by a first detector of the information processing apparatus, an orientation of a member movably attached in an least first and second axial directions with respect to a main body of the information processing apparatus with respect to the main body;

detecting, by a second detector of the information processing apparatus, whether the main body is connected to a cradle apparatus; and controlling, by a processor of the information processing apparatus, an operation of a projection device based on an output of the first and second detectors, wherein the member includes a display on a surface of the member, the detecting an orientation of the member includes detecting whether the member is in an open or a closed state with respect to the main body in relation to the first axial direction, and detecting whether the surface of the member including the display is facing inward or outward with respect to the main body in relation to the second axial direction, and the controlling includes outputting, by the processor, a command controlling the projection device to project an image when an output of the first detector indicates that the member is in the closed state and the display is facing outward and an output of the second detector indicates that the main body is connected to the cradle.

* * * * *